Patented June 17, 1952

2,600,451

UNITED STATES PATENT OFFICE 2,600,451

COPOLYMERS OF METHACRYLIC AND VINYL ESTERS

William L. Van Horne and La Verne N. Bauer, Philadelphia, and Harry T. Neher, Bristol, Pa., assignors to Rohm & Haas Company, Philadelphia, Pa., a corporation of Delaware No Drawing. Application May 12, 1950, Serial No. 161,726

4 Claims. (Cl. 260—86.1)

This invention deals with copolymers of (A) esters of methacrylic acid and saturated aliphatic monohydric alcohols of 16 to 18 carbon atoms and (B) vinyl esters of saturated aliphatic monocarboxylic acids of 6 to 12 carbon atoms, the proportion of methacrylic ester groups (A) to vinyl ester groups (B) being from 1:1 to 1:12 on a molar basis.

This invention also relates to compositions of matter comprising a wax-containing hydrocarbon liquid having dissolved therein at least one of the above-defined copolymers in an amount sufficient to depress the pour point of the said liquid.

Various polymers and interpolymers of unsaturated esters have been proposed. But among these there do not appear the particular copolymers based upon the particular esters and in the proportions here required for the purposes of this invention.

While proposals have been made to dissolve many types of resinous materials in oils, in relatively few cases have such materials caused a depression of the pour point of oils. Some polymeric products merely thicken the oil and some may improve the temperature-viscosity relationship. The pour point may remain unaltered. In some instances it may be raised. Occasionally the pour point may be depressed, but this effect has not been predictable.

We have observed that polymers of cetyl methacrylate, octadecyl methacrylate, vinyl hexoate, vinyl octoate, vinyl isononoate, and the like do not lower the pour point of oils or other hydrocarbon fluids having waxy pour points when individual polymers are dissolved therein or when mixtures of such polymers are present in the oils or fluids. In contrast to this situation we have discovered that copolymers of alkyl methacrylates, $ROOCC(CH_3)=CH_2$, where R is an alkyl group having a chain of 16 to 18 carbon atoms, and of vinyl esters of aliphatic monocarboxylic acids, $R'COOH$, wherein R' is an alkyl group having 5 to 11 carbon atoms are effective pour point depressants when the copolymers are formed from mixtures of the two defined types of esters in mole ratios from 1:1 to 1:12.

There are thus copolymerized a methacrylic ester such as cetyl, heptadecyl, or octadecyl methacrylate as one type of ester and as a second type of ester a vinyl ester, representative of which are vinyl hexoate, vinyl isoheptanoate, vinyl heptanoate, vinyl octoate, vinyl 2-ethylhexoate, vinyl 3,5,5-trimethylhexoate, vinyl decanoate, or vinyl laurate. The hydrocarbon chain of the acid forming the ester may be of straight or branched chain structure.

Preparation of esters of the above types is well known. The methacrylates may be made by direct esterification of acid and long-chained alcohol. Vinyl esters may be made by reaction of acetylene and monocarboxylic acid in the presence of a zinc or cadmium salt, particularly a salt of the acid being reacted. Esters of proper size may also be prepared from lower esters by displacement of a small group with a larger.

In the preparation of the copolymers of this invention it is necessary that conditions be chosen which ensure copolymerization and the formation of soluble copolymers. Copolymerization is usually best effected in a solvent, such as benzene, toluene, xylene, or a petroleum naphtha. Copolymerization may also be effected directly in a mineral oil, such as a lubricating oil. A catalyst is added to the solution of the monomers. The amount of catalyst used may vary from about 2% to 12% or more of the weight of the monomers. It is generally desirable to start with a small amount of catalyst and add catalyst from time to time as copolymerization proceeds. Solvent may also be added from time to time. Even though copolymerization may be initiated without solvent, it is generally desirable to add solvent as copolymerization proceeds to ensure homogeneity of the copolymer or solution of the copolymer.

Temperatures of copolymerization from about 75° C. to 140° C. may be used. One temperature may be used at the start and others as copolymerization proceeds. Optimum temperatures depend upon solvent selected, concentration of monomers therein, catalyst selected, and time. Such factors should be fixed with reference to the intended molecular size of copolymer and with regard for maintaining the copolymer in an oil-soluble form. Adherence to conditions described will usually ensure such a soluble copolymer. If gelation should occur as through failure to observe proper conditions, it is best to discard the product. Under the conditions here described copolymers having apparent molecular weights from about 1000 to 50,000 may be prepared.

Suitable catalysts for effecting the desired copolymerization include organic peroxides and acylic azo compounds, such as azodiisobutyronitrile. Suitable peroxides include acetyl peroxide, caproyl peroxide, lauroyl peroxide, benzoyl peroxide, dibenzal peroxide, di-tert.-butyl diperphthalate, tert.-butyl perbenzoate, 2,2-bis(tert.-butylperoxy)butane, methyl ethyl ketone peroxide, di-tert.-butyl peroxide, and tert.-butylhydroperoxide. A single peroxide or several peroxides may be added to the mixture of monomers or the copolymerizing mixture.

If desired, the copolymer may be transferred from the solvent solution to an oil. The solvent can be displaced by oil with the aid of heat and reduced pressure. In this way concentrates of copolymer in oil are made available. They are a convenient form for addition to waxy oils to provide the relatively small amounts which are needed for pour point depressing action.

The following illustrative examples give further and more specific details of typical preparations of copolymers of this invention.

Example 1

There were mixed 417 parts by weight of vinyl caproate, 83 parts of n-octadecyl methacrylate, 19.6 parts of tert.-butyl perbenzoate, and 500 parts of toluene. This mixture was slowly run into a reaction vessel equipped with stirrer which had been heated to 121° C. and had been flushed with nitrogen. Additions of tert.-butyl perbenzoate were made as follows: at 2.75 hours, 7.8 parts; at 4.5 hours, 19.6 parts; at 5.5 hours, 7.8 parts; and at 6.8 hours, 3.1 parts. The temperature was maintained between 110° and 121° C. for 4.25 hours and then at 100° C. until the end of the heating period—18.5 hours in all. The reaction mixture was diluted with 500 parts by weight of toluene. The product was a 33.6% solution of copolymer in toluene. The viscosity of a 30% solution in toluene was 8.2 centistokes at 100° F.

A portion of the above product was transferred to a light petroleum oil by mixing 48 parts of the 33.6% solution, 82 parts of the 30% solution, and 61 parts of a light lubricating oil and heating the mixture to 140° C./2 mm. The resulting 38.4% solution of copolymer in oil was a particularly convenient form for adding the copolymer to wax-containing mineral oils.

Example 2

There were mixed 141 parts of octadecyl methacrylate, 59 parts of vinyl hexoate, 1 part of benzoyl peroxide, and 200 parts of toluene. The mixture was run into a heated reaction vessel which had been flushed with nitrogen over the course of 1.7 hours. The temperature at the start was 120° C. and this was maintained for three hours, at the end of which time the temperature was lowered to 105°–100° C. and held at this level until 7.75 hours, when heating was discontinued. Benzoyl peroxide was added in 0.5 part portions at 4, 5, 6, and 7 hours. The reaction mixture was diluted with 87 parts of toluene. The product was a 39.4% solution of copolymer in toluene. A 30% solution in toluene had a viscosity of 43 centistokes at 100° F.

Example 3

To the reaction vessel fitted with stirrer, reflux condenser, thermometer, and inlet tube for nitrogen gas, there was added a mixture of 75 parts of vinyl laurate, 25 parts of stearyl methacrylate, 7.5 parts of benzoyl peroxide, and 50 parts of toluene over the course of 1.8 hours with the temperature at 100° C. At 3 hours, a solution of 3 parts of benzoyl peroxide in 17 parts of toluene was added. At 4 hours, the temperature was lowered to about 90° C. and kept at 88° C. to 90° C. during the rest of the heating period. At 4.8 hours, there was added 7.5 parts of benzoyl peroxide suspended in 26 parts of toluene. At 5.3 hours, since the reaction mixture was becoming quite viscous, 45 parts of toluene was added. At 5.5 hours, addition was made of 3 parts of benzoyl peroxide in 21 parts of toluene and at 6.75 hours 1 part of benzoyl peroxide in 21 parts of toluene. At 7 hours, 20 parts of toluene was added. Heating was discontinued at 7.75 hours but stirring was continued until the reaction mixture had cooled to 40° C. The product was a 32.5% solution of copolymer in toluene. A 30% solution in toluene had a viscosity of 222 centistokes at 100° F.

Example 4

A mixture of 55 parts of vinyl isononoate, 45 parts of stearyl methacrylate, 5 parts of benzoyl peroxide, and 20 parts of toluene was slowly added to the reaction vessel heated to 100° C. This temperature was maintained for 4 hours and then copolymerization was continued at 90° C. until 7.6 hours. Additions of benzoyl peroxide were made as follows: at 1.83 hours, 2 parts; at 4.4 hours, 5 parts; at 5.4 hours, 2 parts; and at 6.4 hours, 0.8 part. Additions of toluene were 17, 50, 20, 20, 50, and 20 parts at 1.83, 3.1, 4.4, 5.4, 5.5, and 6.4 hours respectively. The product was obtained as a 35.1% solution of copolymer in toluene. A 30% solution had a viscosity of 341.5 centistokes at 100° F.

A mixture of 130 parts of the 35.1% solution of copolymer and 152 parts of light mineral oil were mixed and heated. The toluene was taken off under reduced pressure, heating being carried to 140° C./2 mm. The resulting product was a 30% solution of copolymer in oil, a convenient form for adding copolymer to waxy oils.

Example 5

A mixture was made from 25 parts of vinyl 2-ethylhexoate, 25 parts of a mixed octadecyl-hexadecyl methacrylate (the ratio of octadecyl groups to hexadecyl groups being 2:1), 2.5 parts of benzoyl peroxide, and 25 parts of toluene. A portion of 22 parts of toluene was placed in a reaction vessel and heated to boiling. Thereto there was slowly added the above mixture over the period of 1.7 hours. Another portion of 22 parts of toluene was added when about two-thirds of the mixture had been added. Other additions of toluene were made at 2.8, 4.8, 5.8, and 6.8 hours in amounts of 9, 8, 9, and 8 parts respectively. Additions of benzoyl peroxide were 1, 2.5, 1, and 0.4 part at 2.8, 4.8, 5.8, and 6.8 hours respectively. Temperatures were held at 110° to 120° C. until 4.3 hours and then at 104°–105° C. Heating was discontinued at 7.75 hours. A 31.2% solution of copolymer was obtained.

Example 6

A mixture of 155 parts of cetyl methacrylate, 95 parts of vinyl 3,5,5-trimethylhexoate, 12.5 parts of azodiisobutyronitrile, and 100 parts of toluene was slowly added to the reaction vessel heated at 80° C. Heating was continued for 24 hours at about this temperature. From time to time additions of azodiisobutyronitrile and toluene were made totaling 37 parts and 350 parts respectively. The product was a 37.5% solution of copolymer in toluene. A 30% solution had a viscosity of 17.5 centistokes at 100° F.

Example 7

There were mixed 10.3 parts of cetyl methacrylate, 89.7 parts of vinyl laurate, 5 parts of benzoyl peroxide, and 100 parts of toluene. The mixture was slowly added to the reaction vessel heated at 120° C. and a temperature of 120° to 112° C. was maintained for 3.6 hours and then of 100°–103° C. until the end of the heating period at 7.75 hours. At hourly intervals small portions of benzoyl peroxide and toluene were added, totaling 10 and 50 parts respectively. The product was a 37.5% solution of copolymer in toluene. A 30% solution had a viscosity of 18 centistokes at 100° F.

The effect on the pour point of wax-containing hydrocarbons was determined by dissolving a defined copolymer in such hydrocarbon fluid in an amount sufficient to depress the pour point and subjecting the resulting solution to the A. S. T. M. pour test (D97–47). In some instances, this test was supplemented or replaced with shock chilling and/or maximum pour tests. Cf. Proc. A. S. T. M. 45, appendix I, p. 244 (1945). The shock chilling determination is made by observing the sample during the initial cooling step with the cooling jacket at −60° F.

The useful range for using the copolymers of this invention in hydrocarbon fluids is from a concentration of about 0.01% up to about 5%. In any case, the amount of copolymer dissolved in a hydrocarbon of waxy pour point should be sufficient to depress the normal pour point of the said hydrocarbon.

For the evaluation of the copolymers three oils were selected. One was a 150 Pennsylvania neutral having a pour point of +25° F. (oil I). This was an oil which proved to be relatively sensitive to the action of pour point depressants. A second oil (oil II) was a 500 mid-continent solvent-extracted neutral (S. A. E. 30) having a pour point of +25° F. This was known to be an oil which was not readily changed as to its pour point. The third oil (oil III) was selected to study effects in heavy oils. It was an S. A. E. 90 gear oil, compounded from 30 parts of a 180 Pennsylvania neutral and 70 parts of a 150 Pennsylvania bright stock. It had a pour point also of +25° F.

A copolymer of octadecyl methacrylate and vinyl hexoate in a 1:6 mole ratio was dissolved in oil I at 0.5%. This solution had a pour point of −5° F. Another copolymer from these esters in a 1:12 mole ratio gave pour points in oil I of −15° F., −5° F., and 0° F. at 0.5%, 0.25%, and 0.04% respectively. Copolymers based on mole ratios of 1:0.25 and 1:20 both gave pour points of +25° F. in oil I at 0.5%.

A copolymer from octadecyl methacrylate and vinyl 2-ethylhexoate in a 1:1 mole ratio gave pour points of −5° F., −5° F., and 0° F. at 0.5%, 0.25%, and 0.1% respectively in oil 1.

A copolymer from octadecyl methacrylate and vinyl isononoate in a 1:2 mole ratio gave a pour point of −20° F. at 0.25% in oil I, a pour point of −10° F. in oil II at 0.5% by shock chilling and by the maximum pour method, and a pour point of −5° F. in oil III at 0.1%.

A copolymer from octadecyl methacrylate and vinyl isononoate in a 1:3.8 mole ratio gave pour points of −15° F. and −5° F. at 0.5% and 0.1% respectively in oil I. A similar copolymer in a 1:7.5 mole ratio gave a pour point of −10° F. in oil I at 0.5%.

Copolymers from octadecyl methacrylate and vinyl laurate in mole ratios of 1:0.1 and 1:0.5 gave pour points of +30° F. at 0.5% in oil I.

A copolymer from the same esters but in a 1:1 mole ratio gave pour points of −20° F., −20° F., −15° F., and 0° F. in oil I at 0.5%, 0.25%, 0.1%, and 0.04% respectively. This copolymer in oil III at 0.1% gave a pour point of 0° F.

A copolymer from the same esters but in a 1:6 mode ratio gave pour points of −35° F., −30° F., and −20° F. at 0.5%, 0.25%, and 0.1% respectively in oil I. In oil II at 0.5% the pour point was −15° F. by shock chilling and in oil III at 0.1% −5° F. by the maximum pour test.

A copolymer from the same esters but in a 1:12 mole ratio gave pour points of −35° F., −10° F., and +10° F. at 0.5% respectively in oil I, but was only slightly effective in the other oils.

A copolymer from cetyl methacrylate and vinyl laurate in a 1:1 mole ratio gave pour points of −20° F., −25° F., −20° F., and −5° F. at 0.5%, 0.25%, 0.1%, and 0.04% respectively in oil I. A similar copolymer based on a mole ratio of 1:12 gave pour points of −10° F. at 0.5% to 0.04% in oil I.

A copolymer from cetyl methacrylate and vinyl 3,5,5-trimethylhexoate in a 1:12 mole ratio gave pour points of −10° F. at concentrations from 0.5% to 0.1% in oil I.

A polymer of octadecyl methacrylate gave no depression of pour points. A polymer of vinyl laurate was likewise ineffective. A mixture of these two polymers was not effective. Yet the copolymers of these two kinds of esters are very effective in depressing pour points of wax-containing oils.

A copolymer from a methacrylic ester having cetyl and stearyl groups in about a 1:2 mole ratio and from vinyl laurate, the mole ratio of methacrylate to vinyl groups being 1:4.5, was prepared. A 30% solution thereof in toluene had a viscosity of 17 centistokes at 100° F. In oil I at 0.5% it gave a pour point of −35° F. and at 0.25% of −30° F. In oil II it gave a pour point of −15° F. by shock chilling. In oil III it gave a pour point of +10° F. at 0.1%.

This copolymer was dissolved at 2% in a lubricating oil. The viscosities of this solution were 6.26 centistokes at 210° F. and 53.0 centistokes at 100° F., giving a viscosity index of 61. The oil by itself has viscosities of 5.25 centistokes at 210° F. and 45.1 centistokes at 100° F., giving a viscosity index of 16.

The copolymers of this invention are new. They are characterized by their solubility in hydrocarbon fluids and their capacity for imparting thereto an increase in viscosity which is coupled with some improvement in viscosity index and lowering of pour point when the pour point results from a wax content. These copolymers are useful not only in petroleum lubricating oils having waxy pour points but also in fuel oils and diesel fuels and the like. The fluid hydrocarbons upon which these copolymers act are generally from paraffinic or naphthenic stocks. These copolymers may be used in conjunction with other additives, such as anti-oxidants, oiliness agents, detergents, and the like.

Compositions based on the copolymers of this invention dissolved in a wax-containing hydrocarbon liquid usually contain from 0.01% to 5% of the copolymer. There are some oils which are so susceptible to the action of the copolymers that a concentration of even 0.01% or 0.02% gives a practical depression of the pour point. Some oils advantageously may be treated with 5% or even more of one of these copolymers. This is particularly true in cases in which an increase in viscosity or an improvement in viscosity index is desired along with depression of pour point. In most cases concentrations of 0.05% to 2% of a copolymer are sufficient and highly effective for lowering the pour point and are preferred.

We claim:

1. A copolymer of (A) an ester of methacrylic acid and a saturated monohydric aliphatic alcohol, ROH, in which R is an alkyl chain of 16 to 18 carbon atoms, and (B) a vinyl ester of a saturated aliphatic monocarboxylic acid of 6 to 12 carbon atoms, the molar proportion of the methacrylic ester (A) groups to the vinyl ester (B) groups being from 1:1 to 1:12.

2. A copolymer of cetyl methacrylate and vinyl laurate, the molar ratio of methacrylate to vinyl groups being from 1:1 to 1:12.

3. A copolymer of cetyl methacrylate and vinyl 3,5,5-trimethylhexoate, the molar ratio of methacrylate to vinyl groups being from 1:1 to 1:12.

4. A copolymer of octadecyl methacrylate and vinyl laurate, the molar ratio of methacrylate to vinyl groups being from 1:1 to 1:12.

WILLIAM L. VAN HORNE.
LA VERNE N. BAUER.
HARRY T. NEHER.

REFERENCES CITED

The following references are of record in the file of this patent:

UNITED STATES PATENTS

| Number | Name | Date |
|---|---|---|
| 2,020,714 | Wulff et al. | Nov. 12, 1935 |
| 2,067,706 | Fikentscher | Jan. 12, 1937 |